(12) United States Patent
Ware

(10) Patent No.: US 8,667,728 B2
(45) Date of Patent: Mar. 11, 2014

(54) FISHING LURE

(76) Inventor: Brett Ware, Maryville, MO (US)

(*) Notice: Subject to any disclaimer, the term of this patent is extended or adjusted under 35 U.S.C. 154(b) by 377 days.

(21) Appl. No.: 12/386,750

(22) Filed: Apr. 22, 2009

(65) Prior Publication Data

US 2010/0269398 A1 Oct. 28, 2010

(51) Int. Cl.
*A01K 85/01* (2006.01)
*A01K 85/00* (2006.01)

(52) U.S. Cl.
USPC .......... 43/17.6; 43/42.24; 43/42.32; 43/42.33

(58) Field of Classification Search
USPC ................ 43/17.5, 17.6, 42.24, 42.32, 42.33, 43/42.34
See application file for complete search history.

(56) References Cited

U.S. PATENT DOCUMENTS

| | | | | | |
|---|---|---|---|---|---|
| 2,303,097 | A | * | 11/1942 | Townsend et al. | 43/42.34 |
| 2,691,839 | A | * | 10/1954 | Duerig | 43/42.32 |
| 2,938,294 | A | * | 5/1960 | Bachmann | 43/42.33 |
| 3,762,092 | A | * | 10/1973 | Bercz et al. | 43/17.6 |
| 4,429,482 | A | * | 2/1984 | Honse | 43/42.32 |
| 4,501,084 | A | * | 2/1985 | Mori | 43/17.5 |
| 4,530,179 | A | * | 7/1985 | Larew | 43/42.24 |
| 4,599,820 | A | * | 7/1986 | Hill | 43/4 |
| 4,621,447 | A | * | 11/1986 | Rhodes | 43/17.5 |
| 4,693,028 | A | * | 9/1987 | Hill | 43/4 |
| 4,862,631 | A | * | 9/1989 | Wilson et al. | 43/42.33 |
| 5,293,709 | A | * | 3/1994 | Cripe | 43/3 |
| 5,408,780 | A | * | 4/1995 | Chambers, Sr. | 43/42.32 |
| 5,465,524 | A | * | 11/1995 | Vallone et al. | 43/42.32 |
| 5,490,344 | A | * | 2/1996 | Bussiere | 43/17.6 |
| 5,737,867 | A | * | 4/1998 | Tsutsumi et al. | 43/42.33 |
| 6,115,953 | A | * | 9/2000 | Wise | 43/2 |
| 6,185,859 | B1 | * | 2/2001 | Pirkle | 43/4 |
| 6,684,557 | B1 | * | 2/2004 | Yu | 43/17.6 |
| 6,912,808 | B1 | * | 7/2005 | Mak | 43/42.33 |
| 6,922,935 | B2 | * | 8/2005 | Yu | 43/17.6 |
| 7,089,698 | B2 | * | 8/2006 | Afshari | 43/17.5 |
| 7,189,128 | B2 | * | 3/2007 | Halliday | 441/64 |
| 7,216,455 | B2 | * | 5/2007 | Becker | 43/42.37 |
| 7,226,484 | B2 | * | 6/2007 | Chen | 43/42.33 |
| 7,260,913 | B2 | * | 8/2007 | Becker | 43/17.6 |
| 7,290,897 | B2 | * | 11/2007 | Schmidt | 362/190 |
| 7,572,160 | B2 | * | 8/2009 | Halliday | 441/64 |
| 7,722,218 | B2 | * | 5/2010 | Leung et al. | 43/17.6 |
| 7,819,554 | B2 | * | 10/2010 | Leung et al. | 43/17.6 |
| 7,966,764 | B2 | * | 6/2011 | Johnson et al. | 43/42.32 |
| 8,061,075 | B2 | * | 11/2011 | Herrick | 43/17.6 |
| 8,240,078 | B2 | * | 8/2012 | Hawryshyn et al. | 43/17.6 |
| 8,460,043 | B2 | * | 6/2013 | Halliday | 43/42.32 |
| 8,490,321 | B1 | * | 7/2013 | Butz | 43/17.6 |

(Continued)

FOREIGN PATENT DOCUMENTS

| | | | | | |
|---|---|---|---|---|---|
| JP | 10276618 | A | * | 10/1998 | A01K 85/01 |
| JP | 2002065115 | A | * | 3/2002 | A01K 85/00 |

(Continued)

*Primary Examiner* — Darren W Ark
(74) *Attorney, Agent, or Firm* — Brett J. Trout

(57) ABSTRACT

A game fish lure provided with a body, hook and fishing line retainer. The body is integrally molded with a material which reflects at least one peak wavelength between 300 and 400 nanometers through the semi-transparent body which reflects at least one peak wavelength between 401 and 800 nanometers. The reflective material may either be a fluid dye and/or a reflective particulate. A flavor enhancer, such as sodium chloride, may also be added to the body to further increase the attractiveness of the lure.

27 Claims, 3 Drawing Sheets

(56) References Cited

U.S. PATENT DOCUMENTS

| | | | |
|---|---|---|---|
| 8,528,248 B2* | 9/2013 | Pringle et al. | 43/17.6 |
| 2002/0095848 A1* | 7/2002 | Northouse | 43/3 |
| 2002/0174590 A1* | 11/2002 | Nix et al. | 43/17.6 |
| 2003/0221357 A1* | 12/2003 | Parsons | 43/4.5 |
| 2004/0111951 A1* | 6/2004 | Reed | 43/42.32 |
| 2004/0194188 A1* | 10/2004 | Tooley | 2/69 |
| 2006/0096155 A1* | 5/2006 | Kline | 43/42.33 |
| 2006/0117637 A1* | 6/2006 | Jeckle | 43/3 |
| 2006/0121166 A1* | 6/2006 | Jeckle | 426/395 |
| 2006/0185217 A1* | 8/2006 | Herrick | 43/17.6 |
| 2007/0011936 A1* | 1/2007 | Marino | 43/17.6 |
| 2007/0199228 A1* | 8/2007 | Johnson | 43/3 |
| 2007/0200337 A1* | 8/2007 | Johnson et al. | 43/3 |
| 2007/0261289 A1* | 11/2007 | Hobbins | 43/42.24 |
| 2008/0148622 A1* | 6/2008 | Ashby | 43/17.6 |
| 2008/0289241 A1* | 11/2008 | Hawryshyn et al. | 43/17.6 |
| 2009/0000177 A1* | 1/2009 | Johnson et al. | 43/42.32 |
| 2009/0056196 A1* | 3/2009 | Korteweg | 43/42.24 |
| 2009/0277071 A1* | 11/2009 | Harris, Jr. | 43/42.32 |
| 2010/0037509 A1* | 2/2010 | Halliday | 43/42.32 |
| 2010/0043272 A1* | 2/2010 | Ashby | 43/17.6 |
| 2010/0251595 A1* | 10/2010 | Leung et al. | 43/2 |

FOREIGN PATENT DOCUMENTS

| | | | | |
|---|---|---|---|---|
| JP | 2002238403 A | * | 8/2002 | A01K 85/00 |
| JP | 2003047369 A | * | 2/2003 | A01K 85/01 |
| WO | WO 02089568 A1 | * | 11/2002 | A01K 85/01 |

* cited by examiner

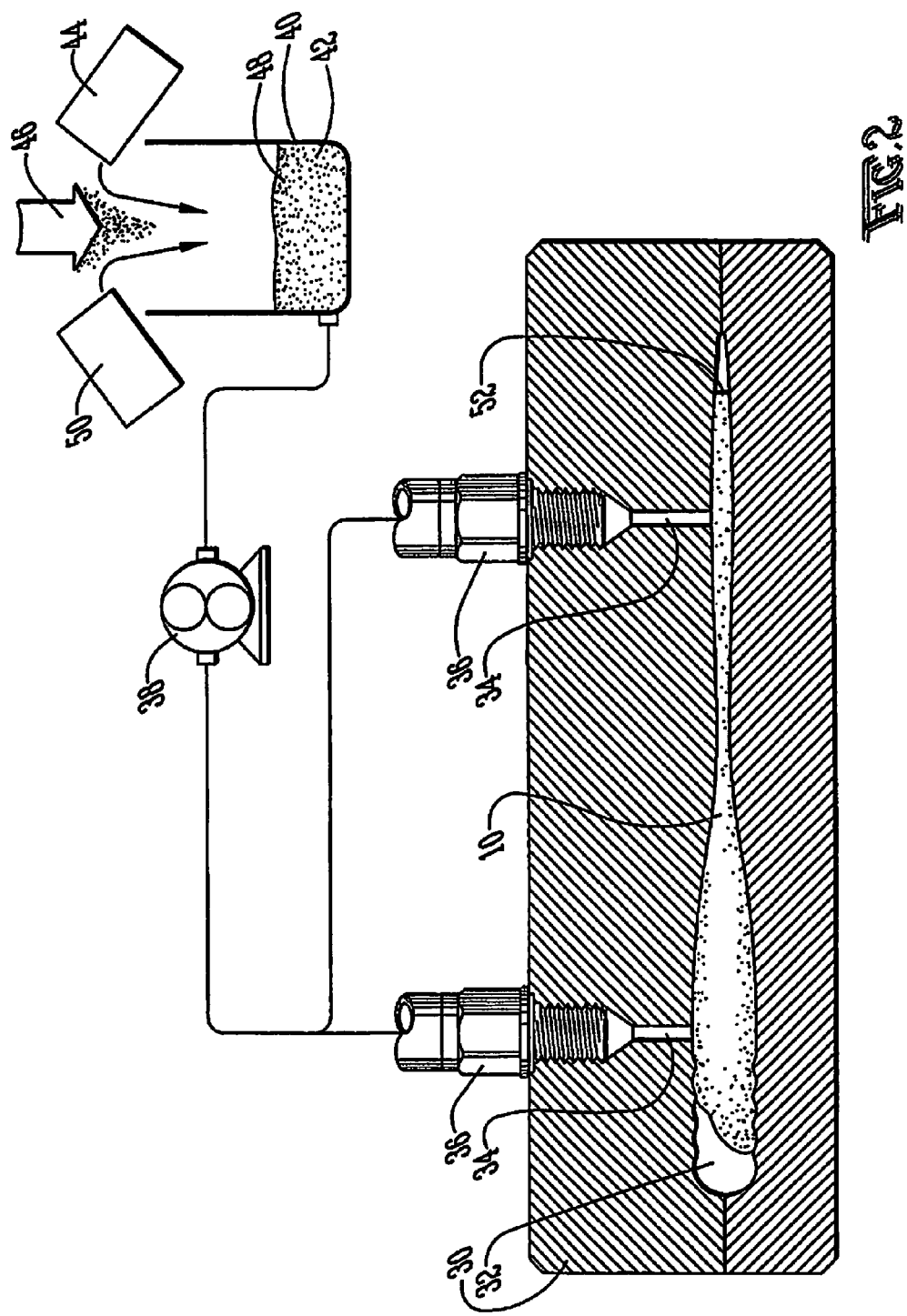

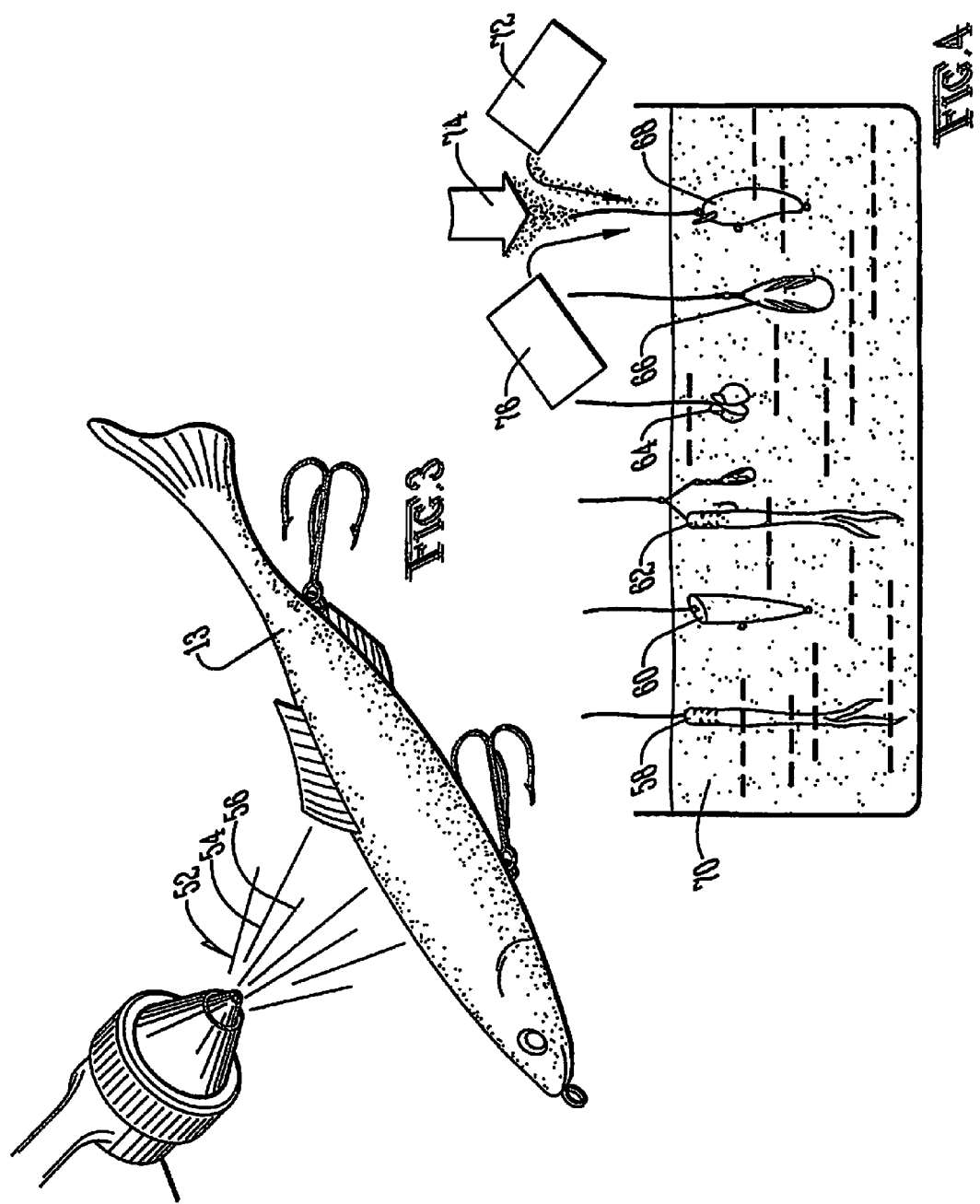

FISHING LURE

BACKGROUND OF THE INVENTION

1. Field of the Invention

The present invention relates in general to a game fish attractant and, more particularly, to a fishing lure which utilizes integrated ultraviolet reflective material to attract game fish.

2. Description of the Prior Art

It is known in the art to provide game fish lures, such as baits, spinners, jigs and the like, with a coating which reflects a visible light of a predetermined wavelength. This imparts a visible color to the game fish lure to visually stimulate game fish toward the lure. One drawback associated with such visible light reflective material being applied to a game fish attractant is that visible light cannot penetrate deeply through the water. Accordingly, as the game fish attractant is dropped deeper into the water, depending on the intensity of the ambient light, the clarity of the water and certain other factors, the color of the game fish attractant diminishes significantly. Indeed, at depths below three meters the colors in the visible spectrum may become virtually invisible to game fish. As the ultraviolet component of sunlight can penetrate water to a depth or more than ten meters, it would be desirable to provide a game fish attractant which utilized ultraviolet light to attract fish beyond a depth of three meters.

Unlike humans, fish have tetra-chromic vision. In addition to receptors for red, green and blue light, certain game fish have a fourth receptor sensitive to ultraviolet light. This allows the game fish to "see" ultraviolet light, which is invisible to humans. Game fish are provided with a sufficient number of ultraviolet receptors so as to allow them to identify reflections of ultraviolet light to a depth of two hundred meters or more in clear water. This allows the game fish to identify things such as blood and prey which reflect light in the ultraviolet spectrum, but would go unnoticed to the human eye at such depths.

To capitalize on this phenomenon, it is known in the art to provide an ultraviolet light reflective coating to enhance the effectiveness of natural and artificial baits and lures in the catching of game fish. As identified in U.S. Patent Application No. 2006/012116 to Milan Jeckele, which is incorporated herein by reference, it is known to apply a viscously fluidic water based polymeric composition to the surface of natural and synthetic baits, which then dries to form a thin, resilient coating on the bait reflective of ultraviolet light. Such coatings contain between one-half percent to seven percent by weight of ultraviolet light reflecting titanium dioxide, sufficiently fine to remain suspended in the coating composition in its fluidic state, and water impermeable when dry.

One drawback associated with such prior art ultraviolet light reflective surface coatings is that such surface coatings provide an unrealistic appearance across the visible spectrum when the lures are used at a shallow enough depth to reflect visible light. An additional drawback associated with such prior art surface coatings is the tendency of the surface coating to wear off from the lure during use, giving the lure an irregular and undesirable ultraviolet reflective signature. It would, therefore, be desirable to provide a game fish attractant which reflected ultraviolet light, but which also provided a realistic visible light spectrum signature and which resisted irregular wearing of the ultraviolet coating.

The difficulties encountered in the prior art discussed hereinabove are substantially eliminated by the present invention.

SUMMARY OF THE INVENTION

Advantageously, this invention provides a game fish attractant adaptable to lures of various configurations and materials.

Advantageously, this invention provides a game fish attractant which reflects visible light of a predetermined wavelength in shallow water.

Advantageously, this invention provides a game fish attractant which reflects ultraviolet light of a predetermined wavelength in deeper water.

Advantageously, this invention provides a game fish attractant which is resistant to abrasive removal of visible and ultraviolet reflective material.

Advantageously, this invention provides a game fish attractant which is of a low-cost manufacture.

Advantageously, in a preferred example of this invention, a game fish attractant is provided with a body, a hook and a fishing line retainer coupled to the body. Integrally molded into the body is a reflective material. When exposed to light, such as sunlight, the body reflects at least one peak wavelength of visible light between four hundred and seven hundred and fifty nanometers, and the reflective material reflects at least one peak wavelength of light between three hundred and fifty and four hundred nanometers.

BRIEF DESCRIPTION OF THE DRAWINGS

The present invention will now be described, by way of example, with reference to the accompanying drawings in which:

FIG. 2 illustrates a side elevation in partial cross-section of the injection molding process used to construct the game fish attractant lure of FIG. 1;

FIG. 3 illustrates a graphic representation of the wavelength reflectance of the game fish attractant lure of FIG. 1; and FIG. 4 illustrates an alternative embodiment of the present invention utilizing a scent applied to the exterior of various game fish attractants constructed in accordance with the teaching of the present invention.

DETAILED DESCRIPTION OF THE PREFERRED EMBODIMENT

Figure 1:
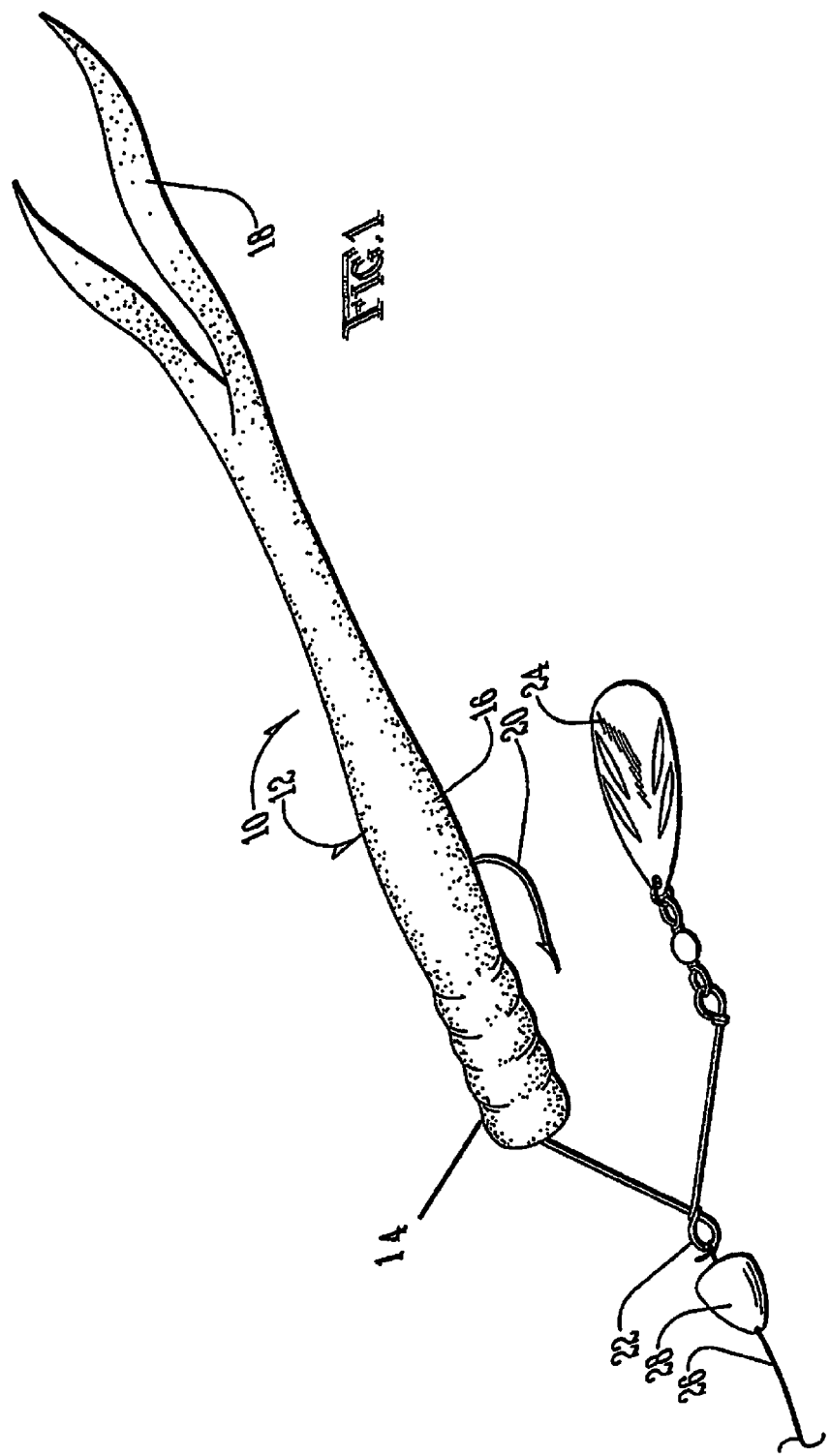
FIG. 1 illustrates a side elevation of a game fish attractant lure of the present invention.

The game fish attractant of the present invention is shown generally as (10) in FIG. 1. The game fish attractant is provided with a body (12) which may be of any desired design or configuration, including those designs and configurations known in the prior art. The body is at least partially translucent to ultraviolet light. It may either be molded of a material at least partially translucent to ultraviolet light and/or coated with a material at least partially translucent to ultraviolet light. The body is in the design of a worm, having a top (14), a middle (16) and a tail (18). Provided within the body (12) is a hook (20) such as those well known in the art. The hook (20) is provided with a fishing line retainer in the form of an eyelet (22). Coupled to the eyelet (22) is a spinner (24). Coupled to the spinner (24) is a length of fishing line (26). Provided on the fishing line (26) is a sinker (28), constructed in accordance with the fish attractant properties of the present invention.

FIG. 2 illustrates the construction of the game fish attractant (10) of the present invention. As shown in FIG. 2, a plastic injection mold (30) is provided with a cavity (32) in the shape of the body (12) in fluid communication with a sprue (34).

The sprue (34) is in communication with a nozzle (36) which, in turn, is coupled to a plastic injection pump (38), such as those known in the art. The pump (38) is coupled to a fluid supply (40). In a preferred embodiment, the fluid supply (40) is filled with a vinyl plastisol (42) having a color at least partially transparent to ultraviolet light. When cured, the vinyl plastisol (42) reflects at least one peak wavelength preferably between 350 and 800 nanometers, more preferably between 450 and 800 nanometers and, most preferably at about 650 nanometers. At such wavelength, the vinyl plastisol (42) reflects between seventy percent and ninety percent of the light, more preferably between seventy-eight percent and eighty-two percent of the light and most preferably about eighty percent of the light. At such wavelength, the vinyl plastisol (42) absorbs ten percent to thirty percent of the light, more preferably between eighteen percent to twenty-two percent of the light and most preferably about twenty percent of the light.

Added to the vinyl plastisol (42) is an ultraviolet reflective material (44). In the preferred embodiment, the ultraviolet reflective material (44) comprises eighty-five percent aromatic hydrocarbon which, in the preferred embodiment, is a light aromatic naptha, such as that designated CAS No: 64742-95-6 having a reflectiveness at a predetermined ultraviolet wavelength. The ultraviolet reflective material (44) also comprises ten percent trimethyl benzene, four percent ultraviolet dye, and one percent zylene. Preferably, these percentages are by weight and may be adjusted within plus or minus twenty percent, more preferably within plus or minus ten percent, and most preferably within plus or minus five percent to achieve the desired results. Preferably the ultraviolet reflective material (44) absorbs less than 80%, more preferably less than 50% and most preferably 20% or less of the ultraviolet light at the predetermined ultraviolet wavelength.

Also, as shown in FIG. 2, ultraviolet particulate (46), such as titanium dioxide, may also be added to the vinyl plastisol (42) to provide an ultraviolet "sparkle" to the game fish attractant (10). The ultraviolet particulate (46), are preferably less than one millimeter in diameter. The titanium dioxide comprises between one-half of one percent and ten percent of the weight of the body (12) and, most preferably, between two percent and seven percent of the total weight of the body (12). At least ten discrete pieces, and preferably hundreds of ultraviolet particulate (46) are added to the vinyl plastisol (42).

Also shown in FIG. 2, a scent compound (48) or other sensory attractant, such sodium chloride, may be coated with an ultraviolet reflective material, such as titanium dioxide, and added to the vinyl plastisol (42) to comprise preferably between one-half of one percent and fifteen percent of the total weight of the body. A visible spectrum dye may be added to the vinyl plastisol (42) to provide the body (12) with a reflectiveness at a predetermined wavelength. In the preferred embodiment, the visible dye (50) comprises by weight thirty-five percent aromatic light naptha, preferably CAS No. 64742-95-6, ten percent titanium dioxide, thirty percent silica clay, ten percent trymethyl benzene, five percent red pigment, and five percent zylene. Preferably the visible spectrum dye (50) absorbs less than 80%, more preferably less than 50% and most preferably 20% or less of the visible light at the predetermined visible wavelength.

As noted above, these weights may be adjusted, preferably plus or minus twenty percent and most preferably plus or minus ten percent. Although other colors of pigment may be substituted or combined with the red pigment, the red pigment provides a color which simulates blood. As real blood is provided with both visible light and ultraviolet light reflective properties, by utilizing the red pigment in conjunction with the titanium dioxide, the game fish attractant (10) of the present invention is provided with a visible signature which includes both a red color in the visible spectrum, and a predetermined wavelength in the ultraviolet spectrum, combining to indicate to a game fish the signature of real blood. The vinyl plastisol (42) is preferably combined with sufficient amounts of ultraviolet reflective material (44), such as ultraviolet flakes (46), ultraviolet coated scent particles (48) and/or visible dye (50), etc. to provide a peak frequency ultraviolet reflectance, preferably between 300 and 400 nanometers, more preferably between 370 and 390 nanometers and, most preferably at about 380 nanometers. At such wavelength, the ultraviolet reflective material (44) reflects between seventy percent and ninety percent of the light, more preferably between seventy-eight percent and eighty-two percent of the light and most preferably about eighty percent of the light. At such wavelength, the ultraviolet reflective material (44) absorbs ten percent to thirty percent of the light, more preferably between eighteen percent to twenty-two percent of the light and most preferably about twenty percent of the light.

Once the desired molding fluid (52) has been homogenized, the molding fluid (52) moves to the pump (38) and into the cavity (32) defined by the mold (30), where the molding fluid (52) is allowed to cure under pressure. The molding fluid (52) may be cured in any type of molding system known in the art.

Alternatively or additionally, the body (12) may be coated with a reflective material comprising an ultraviolet dye and a bonding agent. The bonding agent may be a paint, a synthetic organic coating, an acrylic varnish, a lacquer, a polyurethane or any suitable bonding agent known in the art. The reflective material may be sprayed or painted on the body (12), or the body (12) may be dipped into a quantity of the reflective material.

In the preferred embodiment the body (12) of the game fish attractant (10) demonstrates a one peak light reflectance wavelength at 380 nanometers, and a second peak wavelength reflectance at 650 nanometers. While the peak wavelengths at 380 nanometers and 650 nanometers, mimic those found in natural blood, any desired combination of ultraviolet and visible peaks may be utilized as long as one peak is preferably between 300 and 400 nanometers, and one peak is between 401 and 800 nanometers in wavelength. The 401 and 800 nanometer peak may be between 401 and 495 nanometers to give the body (12) a blue appearance, between 495 and 590 nanometers to give the body (12) a green appearance, between 590 and 620 nanometers to give the body (12) an orange appearance, and/or between 620 and 750 nanometers to give the body (12) a blood red appearance.

As shown in FIG. 3, alternatively or additionally, the body (12) may be coated with a reflective material comprising an ultraviolet dye and a bonding agent. The bonding agent may be a paint, a synthetic organic coating, an acrylic varnish, a lacquer, a polyurethane or any suitable bonding agent known in the art. The reflective material may be sprayed or painted on the body (12), or the body (12) may be dipped into a quantity of the reflective material as explained below.

FIG. 4 illustrates several alternative embodiments of the present invention. As shown, items constructed of hard or soft plastic or metal, such as a jig body (58), a popper (60), a spinner jig system (62), a sinker (64) a spoon (66) and a crank bait (68) are dipped into a solution (70) after being integrally molded with ultraviolet reflective dye and/or ultraviolet reflective particles as described above. The solution (70) is provided with a scent attractant such as sodium chloride (72), ultraviolet particles (74), such as suspended particles of titanium dioxide in a fluid clearcoat (76) which hardens to form a substantially watertight seal.

Although the invention has been described with respect to a preferred embodiment thereof, it is to be understood that it is not to be so limited since changes and modifications can be made therein which are within the full, intended scope of this invention as defined by the appended claims. For example, the present invention may be utilized in association with both hard and soft plastic lures, metallic and nonmetallic lures, rubber lures, buzz baits, lead heads, rubber skirts, blades or any other materials utilized in association with hard or soft plastic lures.

What is claimed is:

1. A fishing lure comprising:
   (a) a lure body having a surface, wherein said lure body is at least partially translucent to ultraviolet light;
   (b) wherein at least a portion of said lure body beneath the surface of, and within said lure body, reflects a first peak wavelength comprising at least one peak wavelength between 401 and 800 nanometers when exposed to visible light;
   (c) wherein said at least a portion of said lure body absorbs at least ten percent of the visible light at said first peak wavelength;
   (d) wherein said at least a portion of said lure body reflects a second peak wavelength comprising at least one peak wavelength between 300 and 400 nanometers when exposed to ultraviolet light; and
   (e) wherein said at least a portion of said lure absorbs less than ninety percent of said ultraviolet light at said second peak wavelength.

2. The fishing lure of claim 1, wherein said at least a portion of said lure body absorbs light at said second peak wavelength between 300 and 400 nanometers to emit said first peak wavelength between 401 and 500 nanometers.

3. The fishing lure of claim 1, wherein said at least a portion of said lure body absorbs light at said second peak wavelength between 495 and 529 nanometers to emit said first peak wavelength between 530 and 590 nanometers.

4. The fishing lure of claim 1, wherein said at least a portion of said lure body absorbs light at said second peak wavelength between 350 and 400 nanometers to emit said first peak wavelength between 530 and 590 nanometers.

5. The fishing lure of claim 1, wherein said at least a portion of said lure body absorbs light at said second peak wavelength between 350 and 400 nanometers to emit said first peak wavelength between 401 and 495 nanometers.

6. The fishing lure of claim 1, wherein said first peak wavelength is between 401 and 500 nanometers.

7. The fishing lure of claim 1, wherein said first peak wavelength is between 495 and 590 nanometers.

8. The fishing lure of claim 1, wherein said first peak wavelength is between 620 and 750 nanometers.

9. The fishing lure of claim 1, wherein said at least a portion of said lure body absorbs at least twenty percent of the visible light at said first peak wavelength.

10. The fishing lure of claim 1, wherein said at least a portion of said lure body absorbs less than eighty percent of said ultraviolet light at said second peak wavelength.

11. The fishing lure of claim 1, wherein said at least a portion of said lure body further comprising a particulate molded therewithin below the surface of said lure body, wherein said particulate reflects at least one peak wavelength between 300 and 400 nanometers.

12. The fishing lure of claim 1, further comprising a hook coupled to said lure body.

13. The fishing lure of claim 1, further comprising a fishing line retainer coupled to said lure body.

14. The fishing lure of claim 13, further comprising a fishing line coupled to said fishing line retainer.

15. The fishing lure of claim 1, wherein said lure body is flexible.

16. The fishing lure of claim 1, wherein said lure body is in the shape of a worm.

17. The fishing lure of claim 1, wherein said lure body is between one centimeter and thirty centimeters in length.

18. The fishing lure of claim 1, wherein said at least a portion of said lure body comprises a reflective material which reflects said second peak wavelength comprising at least one peak wavelength between 370 and 390 nanometers.

19. The fishing lure of claim 18, wherein said reflective material is titanium dioxide.

20. The fishing lure of claim 19, wherein said lure body is flexible.

21. The fishing lure of claim 18, wherein said reflective material is a particulate.

22. The fishing lure of claim 1, further comprising providing said lure body with a material which gives off a scent attractive to fish.

23. A fishing lure comprising:
   (a) a lure body having a surface, wherein said lure body is at least partially translucent to ultraviolet light;
   (b) at least ten discrete reflective items integrally molded into said lure body;
   (c) wherein at least a portion of said lure body, beneath the surface of, and within said lure body, reflects a first peak wavelength comprising at least one peak wavelength between 401 and 800 nanometers; and
   (d) wherein said reflective items reflect a second peak wavelength comprising at least one peak wavelength between 300 and 400 nanometers.

24. The fishing lure of claim 23, further comprising a hook coupled to said lure body.

25. The fishing lure of claim 24, wherein said reflective items reflect said second peak wavelength comprising at least one peak wavelength between 370 and 390 nanometers.

26. The fishing lure of claim 23, wherein said reflective items contain titanium dioxide.

27. The fishing lure of claim 26, wherein said lure body is flexible.

* * * * *